US009170749B2

(12) United States Patent
Okada et al.

(10) Patent No.: US 9,170,749 B2
(45) Date of Patent: Oct. 27, 2015

(54) MANAGEMENT SYSTEM AND CONTROL METHOD FOR COMPUTER SYSTEM FOR MANAGING A STORAGE APPARATUS

(75) Inventors: Wataru Okada, Yokohama (JP); Nobuhiro Maki, Yokohama (JP)

(73) Assignee: HITACHI, LTD., Tokyo (JP)

( * ) Notice: Subject to any disclaimer, the term of this patent is extended or adjusted under 35 U.S.C. 154(b) by 315 days.

(21) Appl. No.: 13/128,532

(22) PCT Filed: Apr. 25, 2011

(86) PCT No.: PCT/JP2011/002400
§ 371 (c)(1),
(2), (4) Date: May 10, 2011

(87) PCT Pub. No.: WO2012/147119
PCT Pub. Date: Nov. 1, 2012

(65) Prior Publication Data
US 2012/0272021 A1     Oct. 25, 2012

(51) Int. Cl.
*G06F 12/00*     (2006.01)
*G06F 13/00*     (2006.01)
*G06F 13/28*     (2006.01)
*G06F 3/06*      (2006.01)

(52) U.S. Cl.
CPC .............. *G06F 3/065* (2013.01); *G06F 3/0605* (2013.01); *G06F 3/067* (2013.01); *G06F 3/0689* (2013.01)

(58) Field of Classification Search
CPC ....... G06F 3/0605; G06F 3/065; G06F 3/067; G06F 3/0689
See application file for complete search history.

(56) References Cited

U.S. PATENT DOCUMENTS

| | | | | |
|---|---|---|---|---|
| 7,222,172 | B2 * | 5/2007 | Arakawa et al. | 709/224 |
| 7,392,360 | B1 * | 6/2008 | Aharoni et al. | 711/170 |
| 7,415,587 | B2 * | 8/2008 | Soejima et al. | 711/162 |
| 7,469,289 | B2 * | 12/2008 | Arakawa et al. | 709/224 |
| 7,721,044 | B1 * | 5/2010 | Chatterjee et al. | 711/114 |
| 7,987,156 | B1 * | 7/2011 | Chatterjee et al. | 707/638 |
| 8,117,235 | B1 * | 2/2012 | Barta | 707/802 |

(Continued)

FOREIGN PATENT DOCUMENTS

JP     2010-102479 A2     5/2010

OTHER PUBLICATIONS

International Search Report and the Written Opinion of the International Searching Authority from PCT/JP2011/002400 filed on Apr. 25, 2011.

*Primary Examiner* — Charles Rones
*Assistant Examiner* — Matthew Chrzanowski
(74) *Attorney, Agent, or Firm* — Volpe and Koenig, P.C.

(57) ABSTRACT

To provide a storage management technique for creating and managing, with single operation by a user, a large quantity of writable snapshots, which satisfy a requirement desired by the user, while controlling a use form of a storage apparatus not to exceed limits of the performance and the capacity of the storage apparatus. Therefore, a management computer manages configuration information and performance information of plural storage apparatuses and an operation state of a writable snapshot. When a writable snapshot is created, the management computer controls, concerning an original snapshot, a use form of the storage apparatuses not to exceed a disk performance limit and a controller performance limit and a capacity limit of a storage on the basis of the number of writable snapshots to be created and a performance requirement (IOPS) and a capacity requirement of the writable snapshot.

6 Claims, 12 Drawing Sheets

(56) References Cited

U.S. PATENT DOCUMENTS

| | | | |
|---|---|---|---|
| 2003/0204597 A1* | 10/2003 | Arakawa et al. | 709/226 |
| 2006/0179220 A1* | 8/2006 | Soejima et al. | 711/114 |
| 2006/0253549 A1* | 11/2006 | Arakawa et al. | 709/217 |
| 2007/0156984 A1* | 7/2007 | Ebata | 711/162 |
| 2008/0082748 A1* | 4/2008 | Liu et al. | 711/114 |
| 2008/0256311 A1* | 10/2008 | Lee | 711/162 |
| 2009/0089458 A1* | 4/2009 | Sugimoto et al. | 710/6 |
| 2009/0249284 A1* | 10/2009 | Antosz et al. | 717/104 |
| 2009/0271485 A1* | 10/2009 | Sawyer et al. | 709/206 |
| 2009/0300277 A1* | 12/2009 | Jeddeloh | 711/104 |
| 2010/0100698 A1* | 4/2010 | Yang et al. | 711/162 |
| 2010/0106688 A1* | 4/2010 | Higuchi et al. | 707/640 |
| 2011/0055500 A1* | 3/2011 | Sasson et al. | 711/162 |
| 2011/0072224 A1* | 3/2011 | Popovski et al. | 711/162 |
| 2012/0246425 A1* | 9/2012 | Tanaka et al. | 711/162 |

* cited by examiner

Fig. 2

| Storage ID | IP address | Storage performance |
|---|---|---|
| ST1 | 192.168.0.2 | 30KIOPS |
| ST2 | 192.168.0.3 | 50KIOPS |
| ST3 | 192.168.0.4 | 40KIOPS |
| ... | ... | ... |

Fig. 3

| LDEV ID | Storage ID | LDEV performance | LDEV capacity | Allocation state | Configuration PG |
|---|---|---|---|---|---|
| LDVE1 | ST1 | 300IOPS | 10G | In use | PG1 |
| LDEV2 | ST1 | 100IOPS | 10G | Not in use | PG2 |
| LDEV1 | ST2 | 100IOPS | 20G | In use | PG3 |
| ... | ... | | | | |

Fig. 6

| WSS ID | GI ID | ST ID | LDEV ID | Difference amount | IO amount | PoolID | Allocation destination host |
|---|---|---|---|---|---|---|---|
| WSS1 | GI1 | ST1 | LDEV1 | 100M | 10IOPS | Pool1 | Host1 |
| WSS2 | GI2 | ST1 | LDEV4 | 120M | 15IOPS | Pool2 | Host2 |
| WSS3 | GI1 | ST2 | LDEV1 | 150M | 12IOPS | Pool1 | Host3 |
| WSS4 | GI1 | ST1 | LDEV1 | 110M | 10IOPS | Pool1 | Host4 |
| WSS5 | GI1 | ST1 | LDEV2 | 100M | 11IOPS | Pool1 | Host5 |
| ... | ... | ... | ... | ... | ... | ... | ... |

MANAGEMENT SYSTEM AND CONTROL METHOD FOR COMPUTER SYSTEM FOR MANAGING A STORAGE APPARATUS

TECHNICAL FIELD

The present invention relates to a management computer, a computer system including the management computer, and a control method for the computer system and relates to, for example, a technique for managing data in a storage apparatus using a snapshot function.

BACKGROUND ART

Recently, in a storage apparatus, data stored in the storage apparatus is managed using a set of files and directories present in the storage apparatus at a point in the past and a snapshot function for realizing recording of the set.

As an application of such a snapshot, for example, Patent Literature 1 discloses a writable snapshot (also referred to as "Writable Snapshot (WSS)" in this specification). In Patent Literature 1, the storage apparatus includes an original snapshot (also referred to as golden image (GI)) and a pool which accumulates a writing request to the original snapshot as a difference (also referred to as difference pool or WSS pool). During reference, the storage apparatus creates a snapshot image after writing from the original snapshot and difference data in the pool to provide a host computer with the writable snapshot (WSS).

CITATION LIST

Patent Literature

PTL 1: Patent Literature 1: JP Patent Publication (Kokai) No. 2010-102479 A

SUMMARY OF INVENTION

Technical Problem

The related art disclosed by Patent Literature 1 is used for the purpose of quickly creating a large quantity of writable snapshots on the basis of one original snapshot.

However, if a single original snapshot is shared among a large quantity of writable snapshots, the one original snapshot is heavily accessed. It is likely that access performance is deteriorated by a bottle neck of a disk in a volume in which the original snapshot is stored or a bottleneck of a controller in a storage. Since a capacity is limited in a single storage apparatus, it is likely that a desired number of writable snapshots cannot be created.

Therefore, a user (also referred to as administrator or operator) needs to ascertain various limits and create writable snapshots. The user cannot create a large quantity of writable snapshots in single operation (requesting and instructing creation once).

In this way, there are the limit due to the performance and the limit due to the capacity. So, there is a demand for a management technique for the storage apparatus which does not exceed these limits.

The present invention has been devised in view of such a situation and provides a storage management technique for, while controlling the performance and the capacity of a storage apparatus not to exceed limits of the performance and the capacity, creating and managing, with single operation by a user, a large quantity of writable snapshots which satisfy requirements desired by the user.

Solution to Problem

In order to solve the problems, a management computer manages configuration information and performance information of plural storage apparatuses and an operation state of a writable snapshot. When the writable snapshot is created, the management computer controls, concerning an original snapshot, a use form of the storage apparatuses not to exceed, a disk performance limit, a controller performance limit of a storage, and a capacity limit on the basis of the number of writable snapshots to be created and a performance requirement (IOPS) and a capacity requirement of the writable snapshots.

Further characteristics related to the present invention will be made apparent from the description of this specification and the accompanying drawings. A form of the present invention is attained and realized by elements and a combination of various elements, the following detailed description, and a form of appended claims.

It is necessary to understand that the description of this specification is merely a typical illustration and by no means limits the scope of claims and application examples of the present invention.

Advantageous Effects of Invention

According to the present invention, in a storage system, a user can create and manage, with single operation, a large quantity of writable snapshots which satisfy desired requirements.

BRIEF DESCRIPTION OF DRAWINGS

FIG. 2 is a diagram showing a configuration example of a storage management table 1121.

FIG. 3 is information indicating a configuration example of a logical volume management table 1122.

FIG. 6 is a diagram showing a configuration example of a WSS management table 1125.

DESCRIPTION OF EMBODIMENTS

The present invention is an invention for, for example, preparing management of a writable snapshot (also referred to as "WSS" in this specification) created over plural housings (plural storage apparatuses).

An embodiment of the present invention is explained below with reference to the accompanying drawings. In the accompanying drawings, in some case, functionally the same components are denoted by the same numbers. The accompanying drawings show specific embodiments and implementation examples conforming to the principle of the present invention. However, these drawings are for the understanding of the present invention and are not used to limitedly interpret the present invention.

This embodiment is explained in detail sufficiently for those skilled in the art to carry out the present invention. However, it is necessary to understand that other implementations and forms are also possible and changes of configurations and structures and replacement of various elements are possible without departing from the scope and the spirit of the technical idea of the present invention. Therefore, the following description should not be interpreted to be limited to the description.

Further, as explained later, the embodiment of the present invention may be implemented as software running on a general-purpose computer or may be implemented as dedicated hardware or a combination of software and hardware.

In the following explanation, kinds of information of the present invention are explained according to a "table" format. However, these kinds of information do not always have to be represented in a data structure by a table and may be represented in a data structure of a list, a DB, a queue, or the like or other structures. Therefore, in order to indicate that the information does not depend on the data structure, in some case, "table," "list," "DB," "queue" and the like are simply referred to as "information".

When contents of the kinds of information are explained, expressions such as "identification information," "identifier," "appellation," "name" and "ID" can be used. These expressions can be interchanged.

Kinds of processing in the embodiment of the present invention are explained below using "program" as a subject (an operation entity). However, since the program is executed by a processor to perform set processing using a memory and a communication port (a communication control device), the processing may be explained using the processor as a subject. The processing disclosed using the program as the subject may be processing performed by a computer or an information processing apparatus such as a management server. A part or all of the program may be realized by dedicated hardware or may be formed as a module. Various programs may be installed in computers by a program distribution server or storage media.

Overview of the Present Invention

Figure 13:
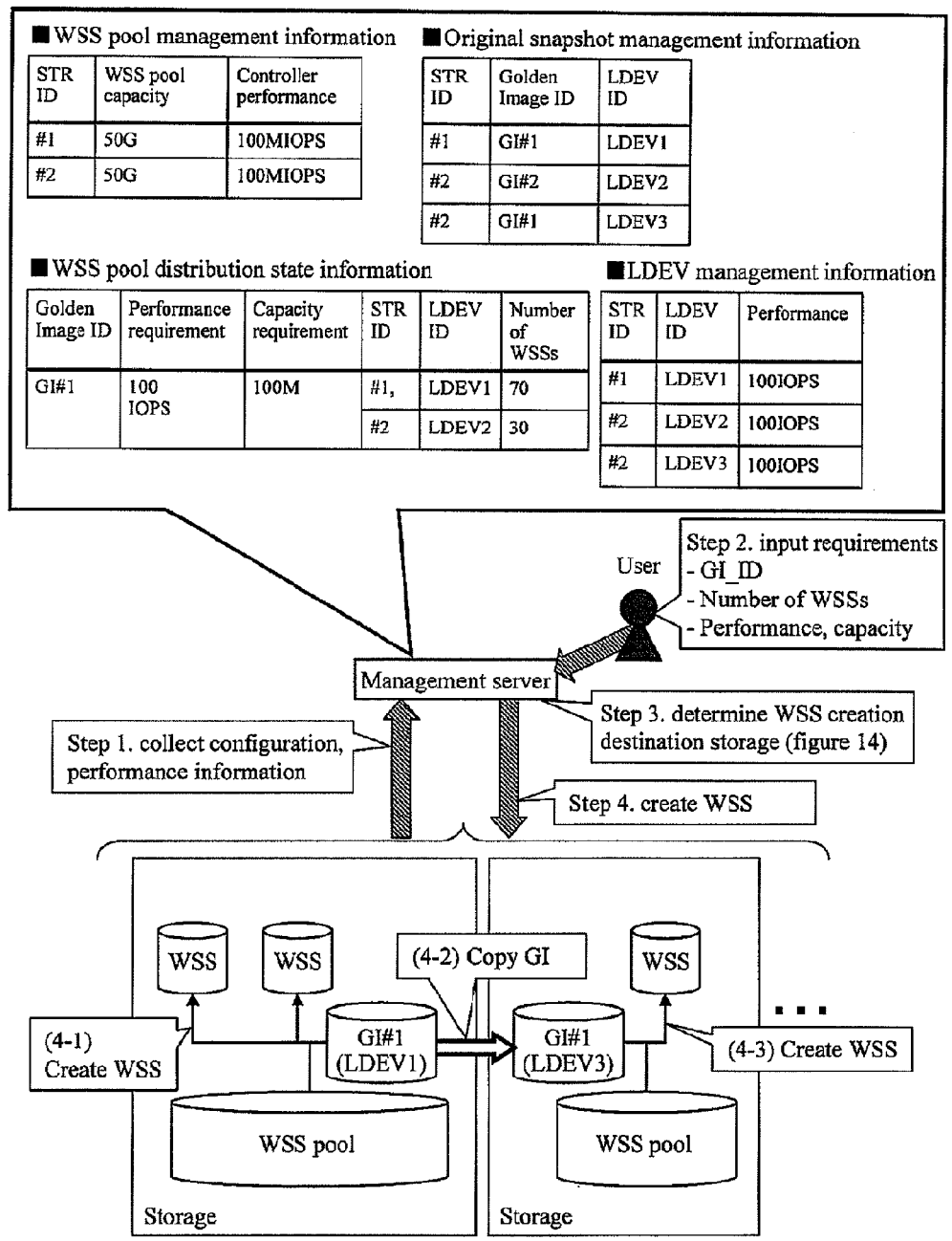
FIG. 13 is a schematic diagram for explaining a processing procedure of the present invention.
Figure 14:
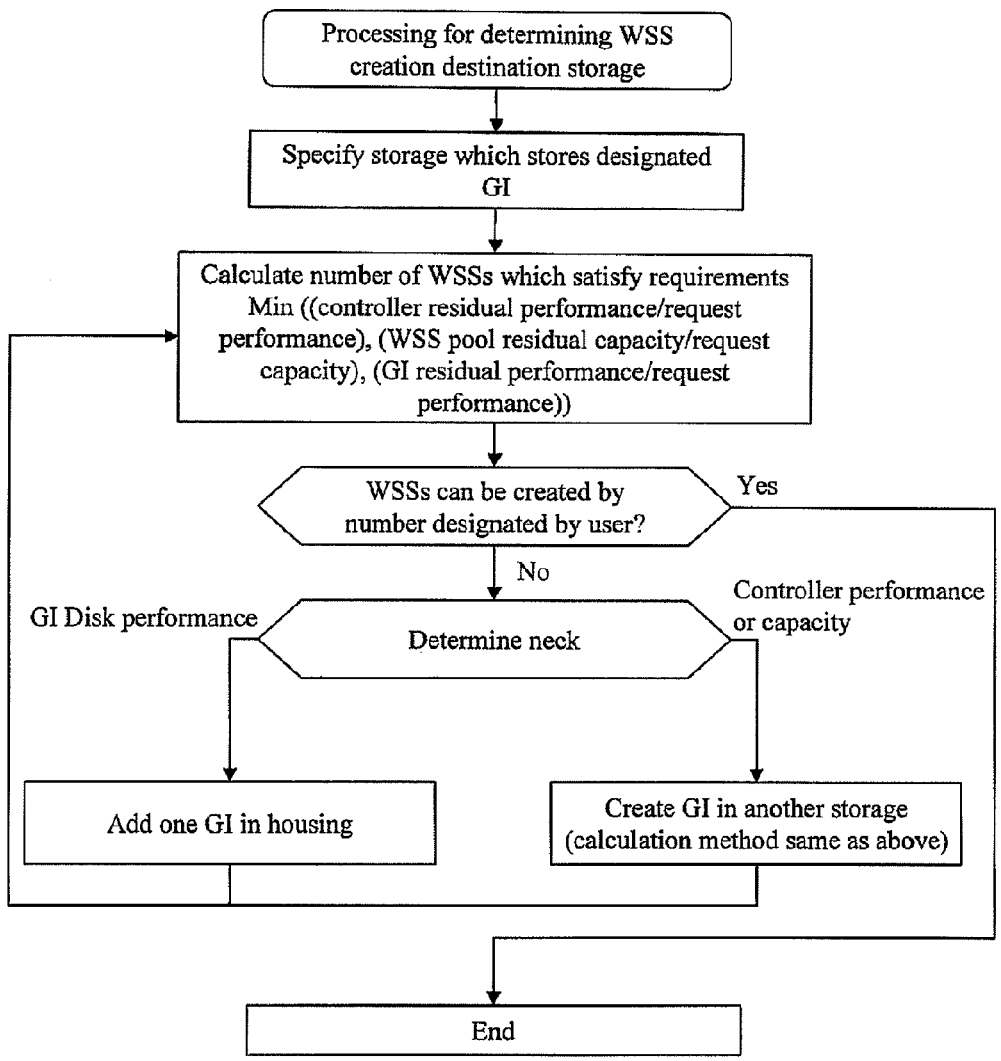
FIG. 14 is a simplified flowchart for explaining a processing overview of the present invention.

Before detailed explanation of an embodiment of the present invention, an overview of the present invention is explained. FIGS. 13 and 14 are diagrams for explaining the overview of the present invention. FIG. 13 is a diagram showing an overview of a processing procedure of the present invention. FIG. 14 is a flowchart of a processing overview of the present invention.

(1) During WSS Creation

When a writable snapshot is created, a management computer collects in advance configuration information, performance information, and the like of storage apparatuses from the storage apparatuses (Step 1). The management computer manages an operation state of a created writable snapshot.

The management computer receives, from a user, an ID of an original snapshot (GI), the number of writable snapshots to be created, a desired performance requirement (IOPS), and a capacity requirement of a difference pool (a difference pool storage area) in use (Step 2).

The management computer determines storage apparatuses at creation destinations of a writable snapshot and the number of original snapshots to be created anew in the storage apparatuses (Step 3: see FIG. 14).

Subsequently, after creating original snapshots (copies) necessary for the storage apparatuses according to the processing in Step 3, the management computer creates writable snapshots with respect to the original snapshots not to reach a disk performance limit (Step 4).

Finally, the management computer manages that the original snapshots created anew are the same (Step 5).

(2) WSS Deletion Processing

Writable snapshots are deleted, for example, according to an instruction of the user. As a result of the deletion, when requirements of all the writable snapshots starting from the same original snapshots are satisfied using smaller numbers of storage apparatuses and original snapshots, the writable snapshots are aggregated. From a storage apparatus in which the writable snapshots are deleted, an original snapshot used as a base by the writable snapshots is deleted.

(3) Update of an Original Snapshot

When an original snapshot is updated in one of the storage apparatuses on the basis of identity management information of the original snapshots among the storage apparatuses created in Step 5 of the writable snapshot creation processing, it is possible to copy the original snapshot among the storage apparatuses to keep the identity.

<Configuration of a Storage System>

Figure 1:
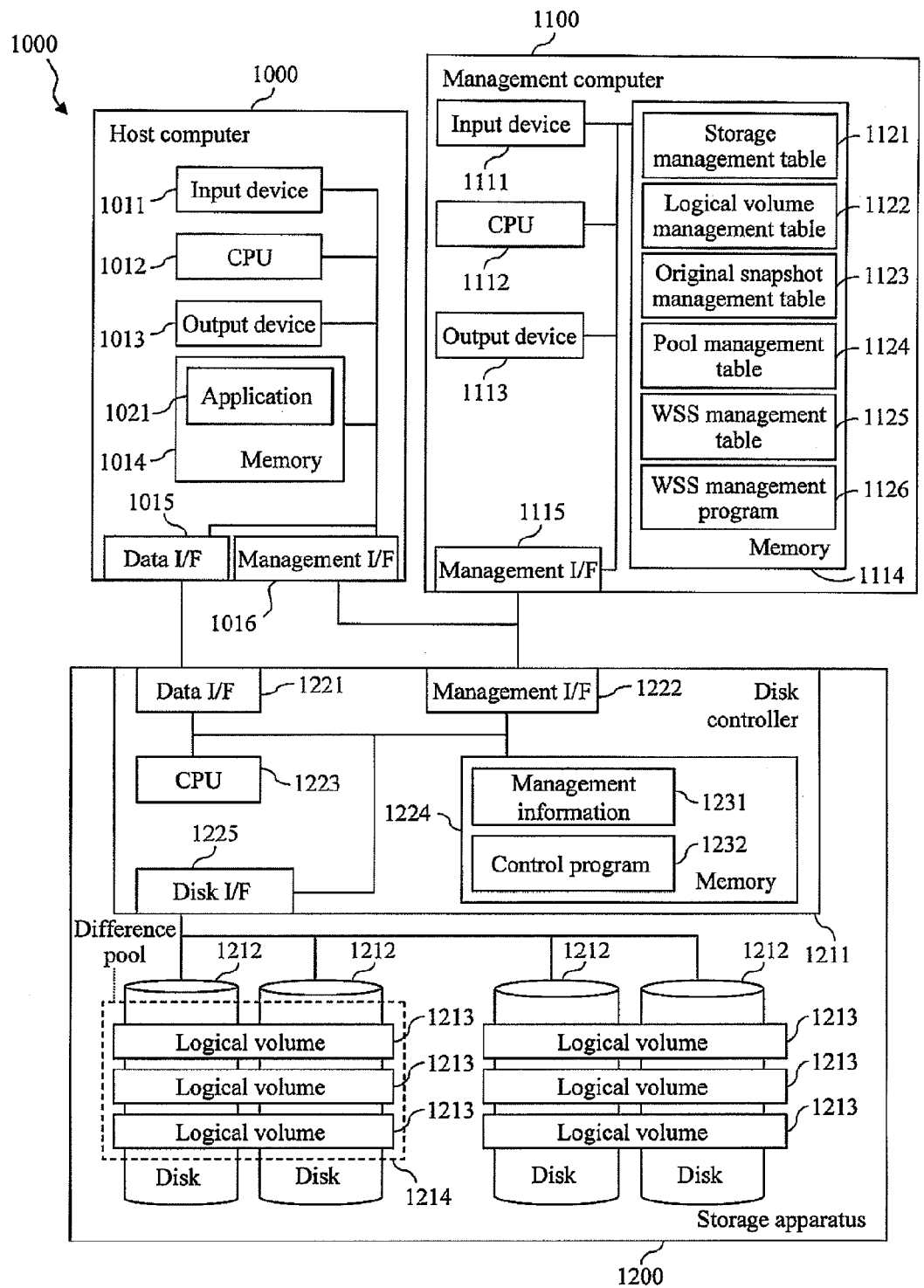
FIG. 1 is a diagram showing a schematic configuration of a storage system (a computer system) according to an embodiment of the present invention.

FIG. 1 is a diagram showing a schematic configuration of a storage system (also referred to as computer system) according to the embodiment of the present invention.

A storage system 100 includes at least one host computer 1000, at least one management computer (which can also be referred to as management server) 1100, and at least one storage apparatus (also referred to as storage subsystem) 1200, which are coupled to one another via a network (e.g., a SAN (Storage Area Network), a LAN (Local Area Network), or a WAN (Wide Area Network)). Plural management computers 1100 are present. In order to realize processing and operation according to the embodiment of the present invention explained later, the plural management computers have to operate in cooperation with one another. For example, ranges of data processing which the management computers take charge of are determined. For example, the plural management computers create writable snapshots according to the ranges (scalability).

The host computer 1000 is a computer which uses a writable snapshot provided by the storage apparatus 1200. The host computer 1000 includes an input device 1011 such as a keyboard or a mouse, a CPU (Central Processor Unit: which can also be simply referred to as "processor") 1012 which executes various kinds of processing in the host computer according to various programs and applications, an output device 1013 such as a display device or a printer, a memory 1014 which stores an application 1021 and various kinds of information, a data I/F 1015, and a management I/F 1016. The application 1021 includes a program for using a writable snapshot crated from an original snapshot. In some case, the application 1021 includes, other than a general application, a hypervisor for loading an image of a virtual machine (VM) in which a writable snapshot is stored and causing the VM to operate. The host computer 1000 is coupled to the storage apparatus 1200 via the data I/F 1015 and coupled to the management computer 1100 via the management I/F 1016. Data I/Fs 1015 and 1221 are interfaces (e.g., interfaces of the SAN) for transmitting and receiving data and control commands between the host computer 1000 and the storage apparatus 1200. Management I/Fs 1016, 1115, and 1222 are interfaces (e.g., interfaces of the LAN) for transmitting and receiving data and control commands between the management computer 1100 and the host computer 1000, between the management computer 1100 and the storage apparatus 1200, and between the host computer 1000 and the storage apparatus 1200. The data I/F and the management I/F may be the same.

The management computer 1100 is a computer which manages a function of a writable snapshot provided by the storage apparatus 1200. The management computer 1100 includes an input device 1111 such as a keyboard or a mouse, a CPU (Central Processor Unit: which can also be simply referred to as "processor") 1112 which executes various kinds of processing in the management computer according to various programs, an output device 1113 such as a display device or a printer, a memory 1114 which stores various kinds of control information and control programs, and a management I/F 1115. The management computer 1100 is coupled to the host computer 1000 and the storage apparatus 1200 via the management I/F 1115.

The memory 1114 stores a storage management table 1121 (see FIG. 2) for managing the performance of controllers of the storage apparatuses 1200, a logical volume management table 1122 (see FIG. 3) for managing the performance, the configuration, and the like of logical volumes created in the storage apparatuses 1200, an original snapshot management table 1123 (see FIG. 4) for managing a use form (a storage location, a capacity, etc.) of an original snapshot, a pool management table 1124 (see FIG. 5) for managing an unused capacity and the like of a pool, a WSS management table 1125 (see FIG. 6) for managing, for example, a relation between an original snapshot and a writable snapshot, and a WSS management program 1126 (see FIGS. 7 to 12) for executing creation, deletion, and the like of a writable snapshot and monitoring (management) and the like of a storage apparatus. Information stored by the storage management table 1121, the logical volume management table 1122, the original snapshot management table 1123, the pool management table 1124, and the WSS management table 1125 is referred to and updated as appropriate by the WSS management program 1126.

The storage apparatus 1200 includes a disk controller 1211 which executes various functions of the other storage apparatuses 1200, which manage I/O requests to a disk device 1212, and plural disk devices 1212. The disk device 1212 includes, for example, a hard disk, an SATA, an SDD, and storage media of other types.

The disk controller 1211 includes a data I/F 1221 for coupling plural host computers 1000 and the storage apparatus 1200, a management I/F 1222 for coupling the management computer 1100 and the storage apparatus 1200, a CPU (Central Processor Unit: which can also be simply referred to as "processor") 1223 which executes various kinds of processing in a storage apparatus according to various programs, a memory 1224 which stores management information 1231 including configuration information and performance information of the storage apparatus and a control program 1232 for executing various kinds of control processing in the storage apparatus, and a disk I/F 1225 for coupling the plural disk devices 1212 and the disk controller 1211 and writing and reading data in and from the disk devices 1212.

The disk controller 1211 performs various kinds of processing concerning a writable snapshot such as management of an original snapshot (GI), management of a difference pool 1214, and processing and control of I/O requests during writing in and readout from the writable snapshot. The disk controller 1211 has, for example, a function of performing logical volume copy in a storage apparatus housing (the same storage apparatus) and logical volume copy between storage apparatus housings (between different storage apparatuses). Further, the storage controller 1211 processes input and output of data to and from a logical volume and sets configuration information and control information in the storage apparatus 1200 in response to requests and instructions from the management computer 1100 and the host computer 1000. Information necessary for these kinds of processing is stored in the management information 1231.

The plural disk devices 1212 include plural logical volumes 1213, which are logical storage areas generated by dividing one or more disk devices 1212 into one or more logical areas. The difference pool 1214, which stores difference data between an original snapshot and a writable snapshot, is configured by one or more logical volumes 1213. The original snapshot is stored in, for example, any one logical volume 1213 other than a logical volume which configures a difference pool. The writable snapshot is configured by the original snapshot and the difference data and virtually provided to the host computer 1000 as a snapshot. As explained above, areas (logical volumes) obtained by logically dividing the one or more disk devices 1212 into one or more areas can be created and managed. However, when logical volumes are created from the plural disk devices 1212, the logical volumes may be created from the disk devices 1212 grouped by the RAID technique.

In the management computer 1100, it is also possible that a serial interface or an Ethernet interface is used as an input and output device as a substitute for the input device 1111 and the output device 1113, a computer for display having a display, a keyboard, or a pointer device is coupled to the interface, information for display is transmitted to the computer for display, and information for input is received from the computer for display to perform display in the computer for display and receive an input in the computer for display to substitute input and display in the input and output device.

In the following explanation, in some case, a set of one or more computers which manage the storage system 100 and display information for display of the present invention is referred to as management system. When the management computer 1100 displays the information for display, the management computer 1100 is a management system and a combination of the management computer 1100 and the computer for display is also a management system. For an increase in speed and improvement of reliability of management processing, plural computers may realize processing equivalent to that of the management server. In this case, the plural computers (including the computer for display when the computer for display performs the display) are management systems.

<Storage Management Table 1121>

FIG. 2 is a diagram showing a configuration example of the storage management table 1121. The storage management table 1121 is a table which manages arrangement locations on a network and performance of the storage apparatuses 1200. The storage management table 1121 has, as configuration information, a storage ID 2001 which is information for identifying the storage apparatuses 1200, an IP address 2002 which is information indicating locations on the network of the storage apparatuses 1200, and storage performance 2003 which is information indicating performance of the storage apparatuses 1200.

An IP address is used for specifying an address on the network of the storage apparatus 1200. When another network protocol such as a SAN is used, an address corresponding to each protocol is stored in the column 2002. The user can set the address via a GUI of a writable snapshot displayed on the display device of the management computer 1000.

The storage performance 2003 is an upper limit of the processing ability of the CPU 1223 of the disk controller 1211 or an upper limit of the processing ability of the data I/F 1221 according to the configuration of the storage apparatus 1200. As a value of the performance, the WSS management program 1126 acquires information concerning the performance of the storage apparatus 1200 from the storage apparatus 1200 (the management information 1231) and sets the information in the storage management table 1121. In general, the processing ability of the CPU 1223 and the data I/F 1225 of the storage apparatus 1200 is acquired and a minimum of the processing ability is the performance value.

Once the configuration information of the table is acquired from the storage apparatuses 1200, the configuration information is not changed unless the configuration is changed. When the storage apparatus 1200 is added, a row is added.

It is seen from the storage management table 1121 that a storage apparatus whose a storage ID is ST1 is set in a location of an IP address 192.168.0.2 and can provide performance of 30K IOPS.

<Logical Volume Management Table>

FIG. 3 is information indicating a configuration example of the logical volume management table 1122. The logical volume management table 1122 has, as configuration information, an LDEV ID 3001 which is information for identifying a logical volume (LDEV), a storage ID 3001 for identifying a storage apparatus to which the logical volume belongs, LDEV performance 3003 which is a maximum processing ability value of logical volumes (a performance value (IOPS) displayed when there is no I/O request from other host computers), an LDEV capacity 3004 which is information indicating a total capacity of the logical volumes, an allocation state 3005 which is variable information indicating allocation states (states of use) of the logical volumes, and a configuration PG 3006 which is information indicating a parity group forming the logical volumes (a set of one or more physical disk devices forming the logical volumes). Present performance values may be managed concerning the logical volumes.

The allocation state 3005 is more specifically information indicating whether a corresponding logical volume is used for the host computer 1000 or used as the difference pool 1214, an original snapshot, or the like. When the logical volume is used (allocated), the allocation state 3005 is "in use." When the logical volume is not used (not allocated), the allocation state 3005 is "unused".

The control program 1232 included in the disk controller 1211 of each storage apparatus 1200 manages, as the management information 1231, the LDEV performance 3003, the LDEV capacity 3004, the allocation state 3005, and the configuration PG 3006. These kinds of information are transmitted to the management computer 1100 according to a request from the WSS management program 1126 of the management computer 1100. The WSS management program 1126 stores the received information in the logical volume management table 1122.

It is understood from the logical volume management table 1122 that, for example, a logical volume whose LDEV_ID is LDEV1 is present in the storage apparatus whose storage ID is ST1, a maximum performance value of the logical volume is 300 IOPS, and a total capacity of the logical volume is 10 G. It is seen that a corresponding logical volume is in use and a disk device configuring the logical volume is a disk device configuring PG1.

<Original Snapshot Management Table>

Figure 4:
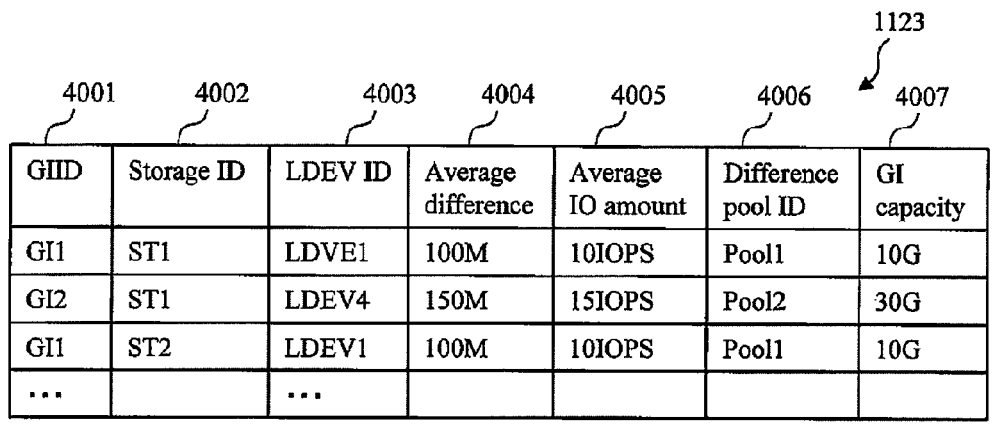
FIG. 4 is a diagram showing a configuration example of an original snapshot management table 1123.

FIG. 4 is a diagram showing a configuration example of the original snapshot management table 1123. The original snapshot management table 1123 has, as configuration information, a GI_ID 4001 which is information for identifying an original snapshot, a storage ID 4002 for identifying a storage apparatus in which a corresponding original snapshot is stored, a LEV_ID 4003 which is information for identifying a logical volume in which the corresponding original snapshot is stored, an average difference 4004 which is information indicating an average of difference data used by the corresponding original snapshot, an average IO amount 4005 which is information indicating average performance (IOPS) for the corresponding original snapshot, a difference pool ID 4006 for identifying a difference pool which stores difference data for the corresponding original snapshot, and a GI capacity 4007 which is information indicating a capacity (a fixed value) of the corresponding original snapshot.

In some case, a data amount accumulated as a difference (a difference data amount) according to a use case (a use form) of an original snapshot is roughly determined. Therefore, in such a case, a value of the difference is input to the space of the average difference 4004 by the user. The average difference 4004 may be determined on the basis of a use state of the original snapshot. Further, when there is no user input, a default value may be input as the average difference 4004. The average difference 4004 may be changeable by the user later. As the average IO amount 4005, the user may input a desired performance value. An average IO amount may be calculated from IOPS in the past. In the original snapshot management table 1123, the user may manage an actual value of an IO amount other than a desired performance value.

Respective kinds of information in the original snapshot management table 1123 can be acquired by a procedure explained below. When the user installs an original snapshot, the user designates, using the GUI or the like of the WSS management program 1126, a storage ID of a storage apparatus at a storage destination of the original snapshot, an LDEV_ID of a logical volume, a difference pool ID of a pool in use, an average difference, an average I/O amount, and an install medium (a CD, a DVD, a logical volume, etc.) of the original snapshot. Then, the WSS management program 1126 installs the original snapshot in the logical volume designated by the user. At this point, the capacity of the original snapshot is acquired. Acquired information is stored in the original snapshot management table 1123. The WSS management program 1126 notifies the control program 1232 of the information input by the user. The control program 1232 stores the information in the management information 1231. Further, the control program 1232 stores the average difference, the average I/O, and an actual operation state in the management information 1231. The WSS management program 1126 periodically acquires the information and updates the table.

It is understood from the original snapshot management table 1123 that, for example, an original snapshot whose GI_ID is 1 is present in a logical volume whose LDEV_ID is LDEV1 of the storage apparatus whose storage ID is ST1. It is seen that average difference data used by the original snapshot is 100 M and the average IO amount is set to 10 IOPS (in the case of user input). It is seen that a difference pool used by the original snapshot is a difference pool whose pool ID is Pool1 and the capacity of the original snapshot is 10 G.

<Pool Management Table>

Figure 5:
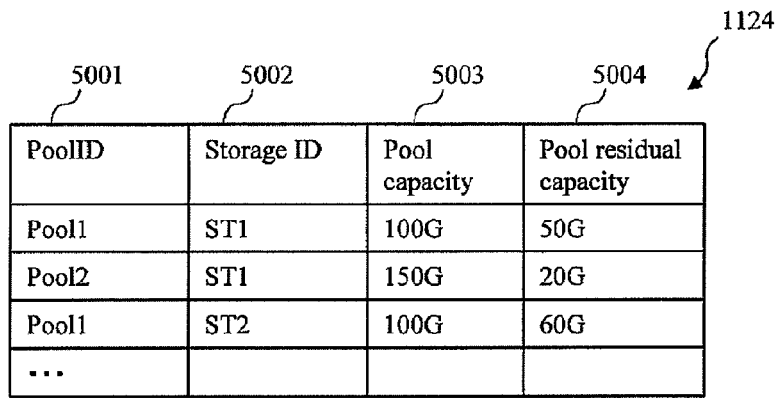
FIG. 5 is a diagram showing a configuration example of a pool management table 1124.

FIG. 5 is a diagram showing a configuration example of the pool management table 1124. The pool management table 1124 has, as configuration information, a pool ID 5002 which is information for identifying a pool which stores difference data for an original snapshot, a storage ID which is information for identifying a storage apparatus to which a corresponding pool belongs, a pool capacity 5003 which is information indicating a total capacity of a difference pool, and a pool unused capacity 5004 which is information indicating an unused capacity of the difference pool.

The respective kinds of information in the pool management table 1124 can be acquired according to a procedure explained below. Specifically, when the user creates a pool, the user inputs, using a GUI or the like of the WSS management program 1126, a storage ID 5002 of the pool creation destination storage apparatus 1200 and a P1ool_ID 5001 to a logical volume for which the pool is configured. The WSS management program 1126 notifies the control program 1232 of the corresponding storage apparatus 1200 of these kinds of input information and stores the information received by the control program 1232 in the management information 1231. The control program 1232 monitors an actual unused capacity of the pool and stores the actual unused capacity in the management information 1231. The WSS management program 1126 periodically acquires information concerning an unused capacity, inputs the information to the column 5004 of this table, and updates the information.

It is understood from the pool management table 1124 that, for example, a difference pool whose pool ID is Pool1 is present in the storage apparatus whose storage ID is ST1, a total capacity of the difference pool is 100 G, 50 G is currently used, and an unused capacity is 50 G.

<WSS Management Table>

FIG. 6 is a diagram showing a configuration example of the WSS management table 1125. The WSS management table 1125 has, as configuration information, a WSS_ID 6001 which is information for identifying a writable snapshot, a GI_ID 6002 which is information for identifying an original snapshot serving as a base of a corresponding writable snapshot, an ST_ID 6003 which is information for identifying a storage apparatus which stores the original snapshot serving as the base, an LDEV_ID 6004 which is information for identifying a logical volume which stores the original snapshot serving as the base, a difference amount 6005 indicating an amount of difference data (an actual use amount) forming the corresponding writable snapshot, an IO amount 6006 indicating an actual I/O amount with respect to the original snapshot serving as the base of the corresponding writable snapshot, a Pool_ID 6007 which is information for identifying a difference pool which stores difference data used by the corresponding writable snapshot, and an allocation destination host 6008 which is information (e.g., an identifier of an interface) for identifying a host computer at an allocation destination of the corresponding writable snapshot.

In the table, one original snapshot is represented by reference numerals 6002 to 6004. As it is seen from FIG. 6, WSS1 and WSS4 are writable snapshot generated using the same original snapshot. In some case, the same original snapshot is present in different storage apparatuses (see WSS1 and WSS3).

Further, in some case, the same original snapshot is present in different volumes in the same storage apparatus (see WSS1, WSS4, and WSS5). This is because, although there is no bottleneck in the disk controller 1211, in some case, a bottleneck is present in a disk device (drive) configuring a parity group and, in this case, accesses can be distributed and loads can be reduced if the parity group is divided to create an original snapshot. For example, if LDEV1 of WSS1 is configured from a parity group PG1 and LDEV2 of WSS5 is configured from a parity group PG2, accesses are distributed.

The respective kinds of information in the WSS management table 1125 can be acquired according to a procedure explained below. Specifically, when the user instructs creation of a writable snapshot using the GUI or the like of the WSS management program 1126, the respective kinds of information of the table are set by the WSS management program 1126. These values are notified from the WSS management program 1126 to the control program 1232 of the corresponding storage apparatus 1200. The control program 1232 monitors operation information of a writable snapshot set as a management target and stores a difference data amount between the writable snapshot and an original snapshot and an IO amount for the writable snapshot in the management information 1231. The WSS management program 1126 acquires the amounts periodically, cyclically, or at arbitrary timing, inputs the values to the table, and updates information.

It is understood from the WSS management table 1125 that, for example, a writable snapshot whose WSS_ID is WSS1 is based on the original snapshot GI1 stored in the logical volume LDEV1 of the storage apparatus ST1, a difference data amount in use is 100M bytes, and an I/O amount for the writable snapshot is 10 IOPS. It is seen that a difference pool which stores the difference data is Pool1 and this pool is allocated to the host computer Host1.

<WSS Creation Processing>

Figure 7:
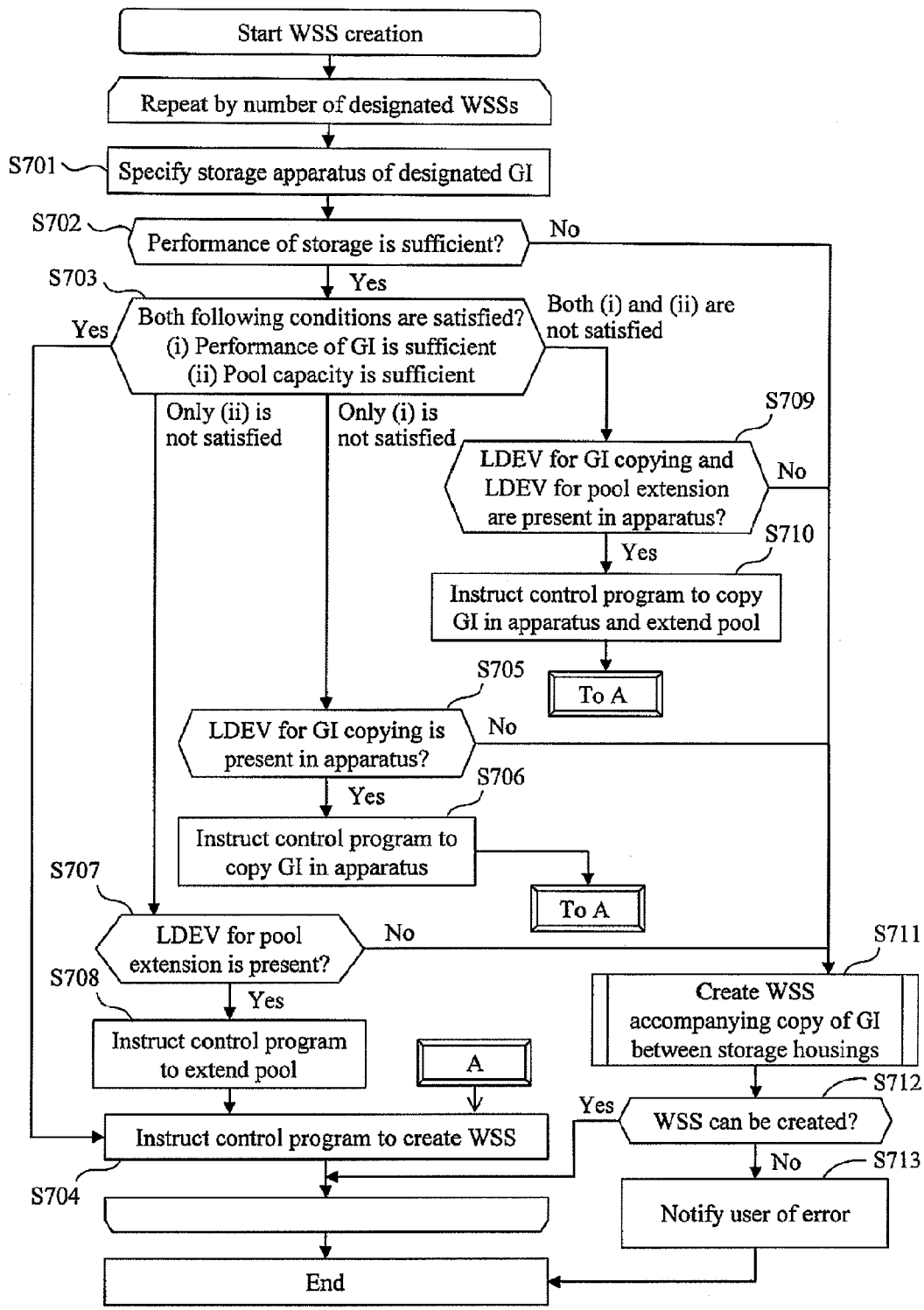
FIG. 7 is a flowchart for explaining processing for creating a writable snapshot.

FIG. 7 is a flowchart for explaining processing for creating a writable snapshot. The user starts WSS creation processing by designating an original snapshot serving as a base of a writable snapshot which the user is about to create (designation of GI_ID) and inputting the number of writable snapshots to be created. The WSS creation processing in FIG. 7 is executed by the input number of writable snapshots.

In S701, the WSS management program 1126 specifies a storage apparatus in which a designated original snapshot is stored. Specifically, the WSS management program 1126 refers to the original snapshot management table 1123 (FIG. 4) and specifies the storage ID 4002 associated with the designated original snapshot.

In S702, the WSS management program 1126 determines whether the performance of the storage apparatus specified in S701 is sufficient. Specifically, the WSS management program 1126 refers to the storage management table 1121 (FIG. 2), subtracts performance (IOPS: the IO amount 6006 shown in FIG. 6) used in an already existing writable snapshot from the storage performance (IOPS) 2003 of the specified storage apparatus, and determines whether there is still a margin in the performance. For example, referring to FIG. 6, since WSS1, WSS2, WSS4, and WSS5 are already created in the storage apparatus ST1, used performance is 46 IOPS (10+15+10+11=46). When this is subtracted from storage performance of 30K IOPS of the storage apparatus ST1, 29954 IOPS is obtained. It is seen that there is still a margin in the performance of the storage apparatus ST1. When the storage performance is sufficient in S702 (Yes in S702), the processing goes to S703. When the storage performance is insufficient (No in S702), since it is likely that the storage apparatus is a bottleneck when a writable snapshot is created in the storage apparatus, the processing goes to S711.

In S703, the WSS management program 1126 determines whether both conditions (i) the performance of the original snapshot is sufficient and (ii) the capacity of a difference pool is sufficient are satisfied. It is determined as explained below whether the condition (i) is satisfied. The WSS management program 1126 specifies, from the original snapshot management table 1123 (FIG. 4), in which logical volume the designated original snapshot is stored and acquires the performance of the specified logical volume referring to the logical volume management table 1122 (FIG. 3). The WSS management program 1126 subtracts a total of IO amounts (performance) used in the same logical volume (e.g., a total of IO amounts of LDEV1 of ST1 is 30 IOPS) from the performance of the logical volume (e.g., the performance of LDEV1 of ST1 is 300 IOPS) referring to the WSS management table 1225 (FIG. 6) and, if there is still a margin, the condition (i) is satisfied. It is determined as explained below whether the condition (ii) is satisfied. The WSS management program 1126 specifies the difference pool 4006 used by the designated original snapshot referring to the original snapshot management table 1123 (FIG. 4). The WSS management program 1126 determines whether the unused capacity 5004 of the pool is larger than the average difference 4004 (FIG. 4: e.g., a value set by the user) and, if the unused capacity 5004 is larger than the average difference 4004, the condition (ii) is satisfied. When both the condition (i) and the condition (ii) are satisfied, the processing goes to S704. When only the condition (ii) is not satisfied (when only the condition (i) is satisfied), the processing goes to S707. When only the condition (i) is not satisfied (when only the condition (ii) is satisfied), the processing goes to S705. When both the conditions (i) and (ii) are not satisfied, the processing goes to S709.

In S705, the WSS management program 1126 determines whether a logical volume for original snapshot copying is present in the storage apparatus specified in S701. When the condition (i) is not satisfied, i.e., when the performance of the original snapshot is insufficient (when there is no margin in the performance of the logical volume which stores the relevant original snapshot), a disk device group (PG) forming LDEV in the same apparatus has to be divided. Therefore, in S705, it is determined whether a logical volume for copying the original snapshot is usable. More specifically, the WSS management program 1126 determines, referring to the logical volume management table 1122 (FIG. 3), whether a logical volume which belongs to a "PG" different from a PG forming the logical volume determined as insufficient in performance and whose allocation state 3005 is "unused" and whose the LDEV capacity 3004 is larger than the capacity of the original snapshot (see the GI capacity 4007 shown in FIG. 4) is present in the storage apparatus. When such a logical volume is present (Yes in S705), the processing goes to S706. When such a logical volume is not present (No in S705), the processing goes to S711.

In S706, the WSS management program 1126 instructs the control program 1232 of the storage apparatus specified in S701 to create a copy of the original snapshot in the logical volume specified in S705 in the storage apparatus. The processing goes to S704.

In S707, the WSS management program 1126 determines whether a logical volume for pool extension is present. More specifically, the WSS management program 1126 determines, referring to the logical volume management table 1122 (FIG. 3), whether a logical volume whose allocation state 3005 is "unused" is present in the storage apparatus specified in S701. This logical volume is a logical volume (LDEV) for pool extension for storing difference data. When the logical volume for pool extension is present (Yes in S707), the processing goes to S708. When the logical volume for pool extension is not present in the storage apparatus specified in S701 (No in S707), the processing goes to S711.

In S708, the WSS management program 1126 instructs the control program 1232 of the storage apparatus specified in S701 to set the logical volume specified in S707 as a difference pool.

In S709, the WSS management program 1126 determines whether a logical volume for original snapshot copying and a logical volume for pool extension are present in the storage apparatus specified in S701. The determination concerning whether the logical volumes are present is as explained above. When both the logical volumes are present (Yes in S709), the processing goes to S710. When it is determined that at least one of the logical volumes is not present (No in S709), the processing goes to S711.

In S710, the WSS management program 1126 instructs the control program 1232 of the storage apparatus specified in S701 to create a copy of the original snapshot in an "unused" logical volume in the storage apparatus and sets the "unused" logical volume of the storage apparatus in the difference pool area 1214. According to this instruction, the control program 1232 creates a copy of the original snapshot and extends the area of the difference pool.

In S704, the WSS management program 1126 instructs the control program 1232 of the storage apparatus specified in S701 to create, on the basis of the original snapshot specified by the processing explained above, a writable snapshot which stores difference data in a specific difference pool area. According to the instruction, the control program 1232 creates a writable snapshot. When the conditions (i) and (ii) are satisfied (Yes in S703), a writable snapshot which stores difference data in the difference pool area 1214 prepared as a difference pool in advance is created on the basis of the original snapshot designated by the user. When only the condition (ii) is not satisfied, a writable snapshot which stores difference data in a logical volume of the difference pool extended in S708 is created on the basis of the original snapshot designated by the user. Further, when only the condition (i) is not satisfied, a writable snapshot which stores difference data in the difference pool area 1214 prepared as a difference pool in advance is created on the basis of the original snapshot copied to the logical volume secured for original snapshot copying in the same storage area.

On the other hand, in S711, the WSS management program 1126 copies the original snapshot in a storage apparatus different from the storage apparatus specified in S701 and attempts to generate a writable snapshot based on the original snapshot. Since there is no margin for creating a writable snapshot in the storage apparatus specified in S701, the WSS management program 1126 determines whether a writable snapshot can be created in another storage apparatus. When a writable snapshot can be created in another storage apparatus, the storage apparatus is used. Details of the processing in S711 are explained with reference to FIG. 8.

In S712, the WSS management program 1126 determines whether a writable snapshot can be created by the processing in S711. When a writable snapshot can be created (Yes in S712), the processing ends. When a writable snapshot cannot be created (No in S712), the processing goes to S713. The WSS management program 1126 notifies the user of a WSS creation processing error and ends the processing. For example, it is conceivable to display the error on a GUI of the management computer 1100 or emit alarm sound for informing the error. However, the notification of the error is not limited to this. Any means may be used as long as the means can inform the user of the error.

When a copy of the original snapshot is generated by the processing in S711, the WSS management program 1126 updates the original snapshot management table 1123 (FIG. 4). Specifically, the storage ID 4002 and the LDEV_ID 4003 are set according to a storage apparatus and a logical volume at a copy destination. As the average difference 4004, the average IO amount 4005, and the GI capacity 4007, values of the original snapshot at a copy source only have to be copied. On the other hand, a pool whose pool unused capacity 5004 exceeds the average difference 4004 is associated with the difference pool ID 4006 with reference to the pool management table 1124 (FIG. 5). Further, the allocation state 3005 of the logical volume management table 1122 (FIG. 3) is set from "unused" to "in use".

When the difference pool is extended, the pool management table 1124 is updated. The capacity of the added volume is added to the pool capacity 5003 and the pool unused capacity 5004. The allocation state of the logical volume management table 1122 (FIG. 3) is set from "unused" to "in use".

Further, when a writable snapshot is created, the WSS management table 1125 (FIG. 6) is updated. In FIG. 6, as the WSS_ID, an ID unique in the storage system 100 is automatically given. In the GI_ID 6002, the ST_ID 6003, and the LDEV_ID 6004, IDs (6002 to 6004) corresponding to the GI_ID of the original snapshot serving as the base are set. The difference amount 6005 and the IO amount 6006 are set to 0. An ID corresponding to the GI_ID of the original snapshot serving as the base is copied to the Pool_ID 6007.

<Details of S711 (WSS Creation Processing Accompanying Copy of GI Between Storage Housings>

Figure 8:
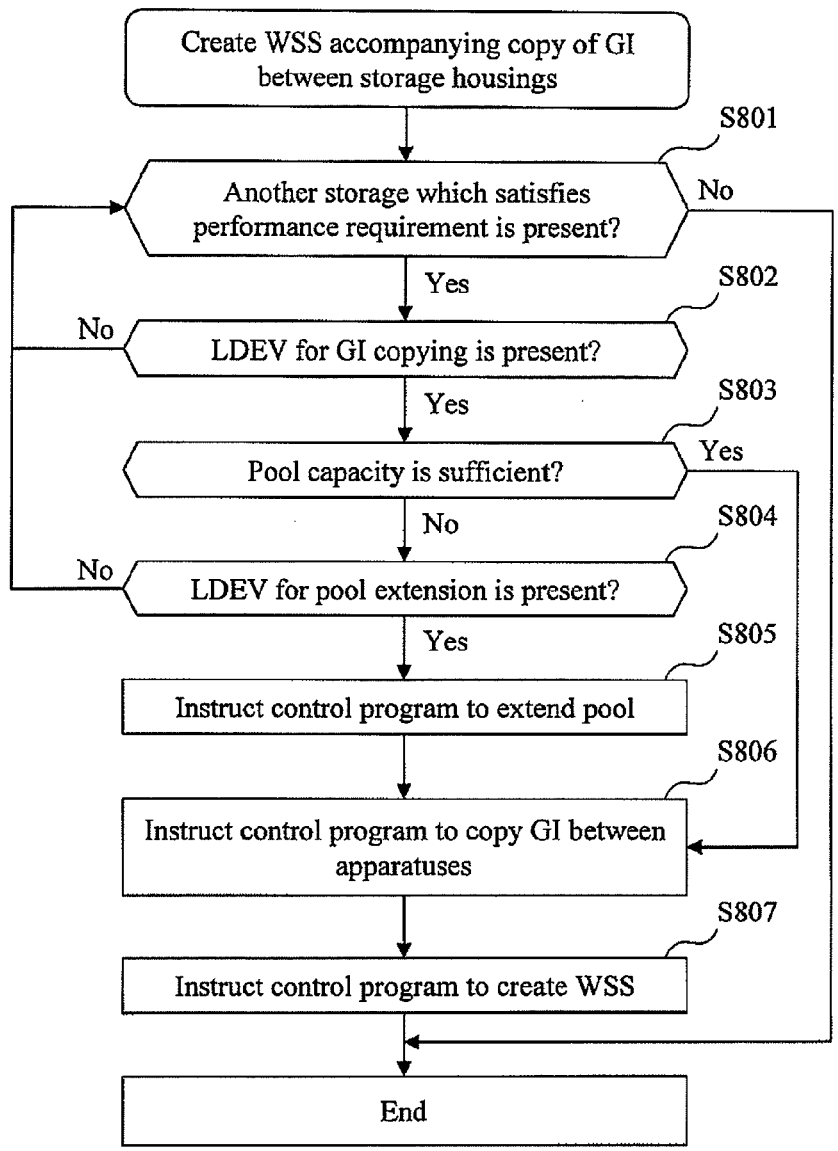
FIG. 8 is a flowchart for explaining details of S711 (WSS creation processing involving copying GI between housings) in FIG. 7.

FIG. 8 is a flowchart for explaining details of S711 (WSS creation processing accompanying copy of GI between storage housings) in FIG. 7.

In S801, the WSS management program 1126 determines whether a storage apparatus which satisfies a performance requirement is present in storage apparatuses different from the storage apparatus specified in S701. As in S702, the WSS management program 1126 refers to the storage management table 1121 (FIG. 2), subtracts the performance (IOPS: the IO amount 6006 shown in FIG. 6) used in the already existing writable snapshot from the storage performance (IOPS) 2003 of a storage apparatus set as a processing target, and determines whether a value obtained by the subtraction is larger than the desired average IO amount 4005 and there is still a margin in the performance. When a storage apparatus which satisfies the performance requirement is not present (No in S801), the processing in FIG. 8 ends and goes to S712. When a storage apparatus which satisfies the performance requirement is present (Yes in S801), the processing goes to S802.

In S802, the WSS management program 1126 determines whether a logical volume for original snapshot copying is present in the storage apparatus specified in S801. Specifically, the WSS management program 1126 determines whether a logical volume which has a capacity larger than the capacity (see the GI capacity 4007) of the original snapshot to be copied and whose allocation state 3005 is "unused" is present in the specified storage apparatus (set as a copying destination candidate). When such a logical volume is present (Yes in S802), the processing goes to S803. When such a logical volume is not present (No in S802), the processing returns to S801 and the WSS management program 1126 determines again whether another storage apparatus which satisfies the performance requirement is present.

In S803, the WSS management program 1126 determines whether a pool capacity of a difference pool area of the storage apparatus specified in S801 is sufficient. In other words, the WSS management program 1126 determines whether an unused capacity of a relevant pool (the pool unused capacity 5004) is larger than the capacity of the original snapshot (the GI capacity 4007). When the pool capacity is sufficient (Yes in S803), the processing goes to S806. When the pool capacity is insufficient (No in S803), the processing goes to S804.

In S804, the WSS management program 1126 determines whether a logical volume for pool extension is present. Specifically, the WSS management program 1126 refers to the logical volume management table 1122 (FIG. 3) and determines whether a logical volume whose allocation state 3005 is "unused" is present in the storage apparatus specified in S801. When such a logical volume is present (Yes in S804), the processing goes to S805. When such a logical volume is not present (No in S804), the processing returns to S801. The WSS management program 1126 determines again whether another storage apparatus which satisfies the performance requirement is present.

In S805, the WSS management program 1126 instructs the control program 1232 of the storage apparatus specified in S801 to extend the difference pool to the logical volume specified in S804 (set relevant LDEV as a pool). According to the instruction, the control program 1232 sets the specified logical volume in the difference pool area 1214.

In S806, the WSS management program 1126 instructs the control program 1232 of the storage apparatus (at a copy destination) specified in S801 to create, in the specified storage apparatus, a copy of the original snapshot present in the storage apparatus at a copy source. According to the instruction, the control program 1232 creates a copy of the original snapshot.

In S807, the WSS management program 1126 instructs the control program 1232 of the storage apparatus at the copy destination to create a writable snapshot based on the original snapshot of the copy created in S806.

The WSS creation processing accompanying copy of GI between storage housings ends and the processing goes to S712.

Update of the various relation tables during copying of the original snapshot, during the pool extension, and during creation of a writable snapshot is executed as explained in the processing shown in FIG. 7 in the same manner in the WSS creation processing accompanying copy of GI between storage housings.

<WSS Deletion Processing>

Figure 9:
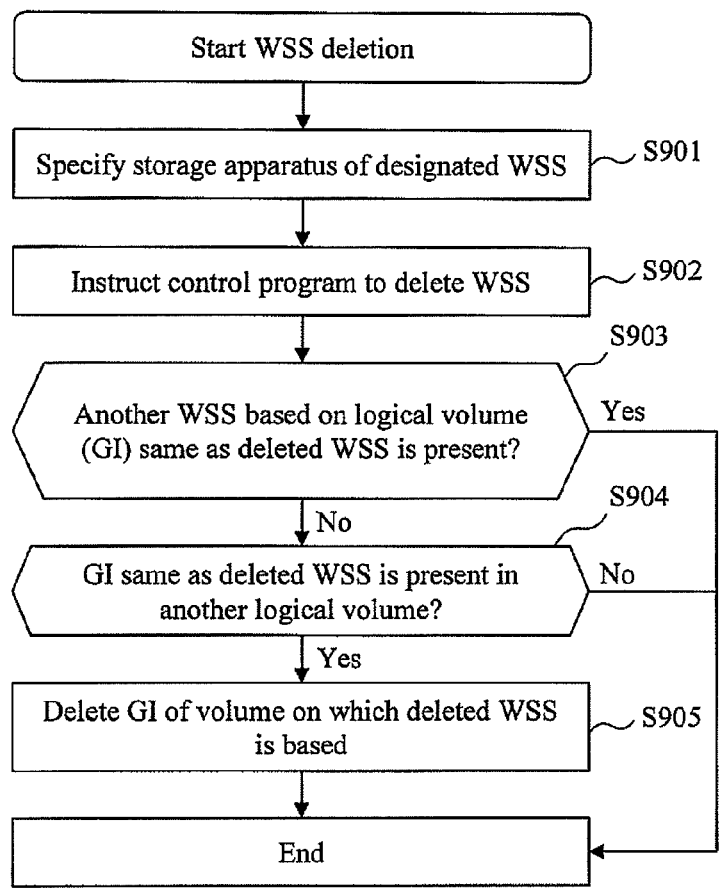
FIG. 9 is a flowchart for explaining processing for deleting a writable snapshot.

FIG. 9 is a flowchart for explaining processing for deleting a writable snapshot. The user starts the WSS deletion processing by designating a writable snapshot set as a deletion target using a GUI or the like.

In S901, the WSS management program 1126 refers to the WSS management table 1125 (FIG. 6) and specifies a storage apparatus which stores a writable snapshot designated to be deleted.

In S902, the WSS management program 1126 instructs the control program 1232 of the storage apparatus specified in S901 to delete the relevant writable snapshot. According to the instruction, the control program 1232 deletes the relevant writable snapshot. When the writable snapshot is deleted, a relevant record is deleted from the WSS management table 1125. In the pool management table 1124, a difference amount of the WSS management table 1125 is added to the pool unused capacity 5004. After the writable snapshot is deleted, a pool unused capacity may be reacquired from the relevant storage apparatus.

In S903, the WSS management program 1126 determines whether another writable snapshot based on an original snapshot on which the writable snapshot deleted in S902 is based is present. When such a writable snapshot is not present (No in S903), the processing goes to S904. When such a writable snapshot is present (Yes in S903), the original snapshot cannot be deleted. Therefore, in this case, the processing ends.

In S904, the WSS management program 1126 determines whether an original snapshot (GI) same as the original snapshot on which the writable snapshot deleted in S902 is based is present in another logical volume. When such an original snapshot is present (Yes in S904), the processing goes to S905. When such an original snapshot is not present (No in S904), since the original snapshot is the last one, the original snapshot cannot be deleted. Therefore, in this case, the processing ends. This is because a state without any original snapshot is impossible.

In S905, the WSS management program 1126 deletes the original snapshot on which the deleted writable snapshot is based. This is because, since the original snapshot is not a base of all writable snapshots, it is determined that the original snapshot is unnecessary. When the original snapshot is deleted, a relevant record is deleted from the original snapshot management table 1123. The allocation state 3005 of the logical volume management table 1122 is changed from "in use" to "unused".

The details of the processing for deleting a writable snapshot are as explained above. As another form (a modification), when it is highly likely that processing for copying an original snapshot is executed during writable snapshot creation because of performance insufficiency or the like of a storage apparatus, deletion of the original snapshot may not be executed in order to omit time for the processing for copying the original snapshot. Alternatively, the user may be allowed to set possibility of deletion by setting (changing) a policy.

<Original Snapshot Update Processing>

Figure 10:
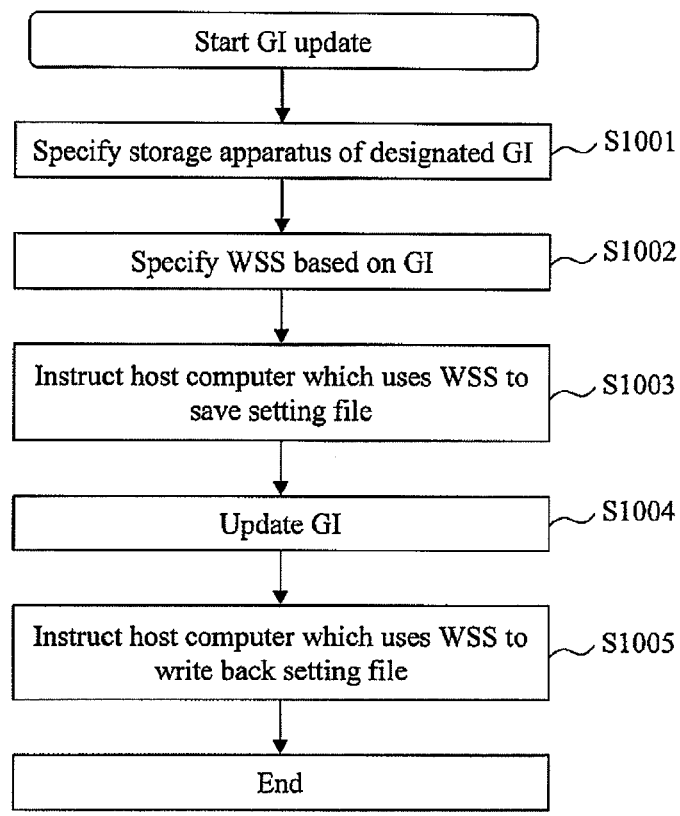
FIG. 10 is a flowchart for explaining processing in updating an original snapshot.

FIG. 10 is a flowchart for explaining processing in updating an original snapshot. The user starts the update processing by designating a GI_ID which is an identifier of an original snapshot and a location of a medium where the original snapshot is installed.

In S1001, the WSS management program 1126 refers to the original snapshot management table 1123 (FIG. 4) and specifies a storage apparatus which stores an original snapshot designated by the user.

In S1002, the WSS management program 1126 refers to the WSS management table 1125 (FIG. 5) and specifies a writable snapshot based on the designated original snapshot.

In S1003, the WSS management program 1126 refers to the WSS management table 1125, specifies the host computer 1000 which refers to (uses) the writable snapshot specified in S1002, and instructs the host computer 1000 to save a user setting file. The host computer 1000 which receives the instruction saves (write out), as the user setting file, a setting peculiar to the user in an area other than a WSS writable by the host computer. This area may be a removable storage medium such as a HDD, a FDD, or a CD directly coupled to the host computer other than a volume of the storage apparatus.

In S1004, the WSS management program 1126 instructs the control program 1232 of the storage apparatus specified in S1001 to update the original snapshot designated by the user. According to the instruction, the control program 1232 updates the original snapshot. According to necessity, the WSS management program 1126 instructs the control programs 1232 of storage apparatuses at a copy source and a copy destination to create a copy of the updated original snapshot in the other storage apparatuses as well.

In S1005, the WSS management program 1126 instructs the host computer 1000 which uses the writable snapshot to write back the user setting file. According to the instruction, the host computer 1000 writes back the user setting file. The host computer 1000 which receives the instruction writes back the user setting file from a location where the user setting file is saved to a storage volume (WSS) before the saving. However, information peculiar to the user included in the user setting file is not always written in the same address in the WSS depending on a file system (FS) or an application (AP) which manages the information. Such information is stored in an address which the FS or the AP can logically interpret.

<Operation Monitoring Processing>

Figure 11:
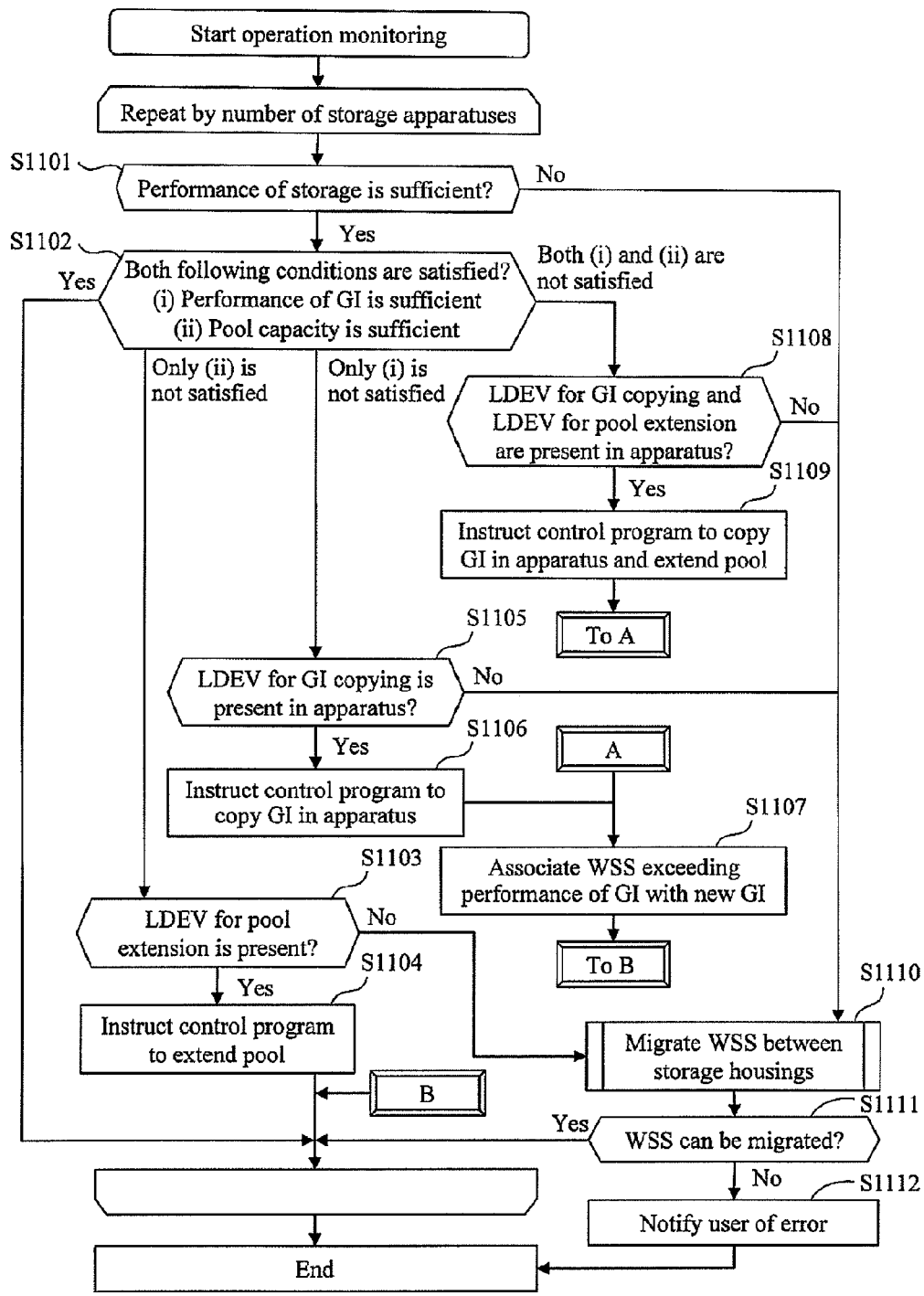
FIG. 11 is a flowchart for explaining operation monitoring processing.

FIG. 11 is a flowchart for explaining operation monitoring processing. The operation monitoring processing is processing for, after creating writable snapshots, monitoring the writable snapshots and performing predetermined processing on the basis of a result of the monitoring. The operation monitoring processing is executed at predetermined timing (periodically, cyclically, or at arbitrary timing such as timing designated by the user). The operation monitoring processing is repeatedly executed by the number of storage apparatuses.

In S1101, the WSS management program 1126 determines whether the performance of a storage apparatus set as a monitoring target is sufficient. More specifically, the WSS management program 1126 determines whether a sum of the IO amounts 6006 in the storage apparatus set as the monitoring target in the WSS management table 1125 (FIG. 6) exceeds the performance 2003 (FIG. 2) of the storage apparatus. When the performance of the storage apparatus set as the monitoring target is sufficient (Yes in S1101), the processing goes to S1102. When the performance is not sufficient (No in S1101), the processing goes to S1110.

In S1102, the WSS management program 1126 determines whether both conditions (i) the performance of a logical volume which stores an original snapshot is sufficient and (ii) the capacity of the difference pool area 1214 is sufficient are satisfied. Whether the condition (i) is satisfied is determined by referring to the WSS management table 1125 (FIG. 6) and the logical volume management table 1122 (FIG. 3) and comparing a sum of the IO amounts 6006 in writable snapshots in which the GI_ID 6002, the ST_ID 6003, and the LDEV_ID 6004 are the same and the LDEV performance 3003 of the logical volume. When the sum of the IO amounts 6006 does not exceed the LDEV performance 3003, the WSS management program 1126 determines that the condition (i) is satisfied. Whether the condition (ii) is satisfied is determined by referring to the pool management table 1224 (FIG. 5) and determining whether the pool unused capacity 5004 of a difference pool in the storage apparatus set as the monitoring target is present. When the pool residual amount is present, the WSS management program 1126 determines that the condition (ii) is satisfied. When both the conditions (i) and (ii) are satisfied, the processing ends and the monitoring target is changed to the next storage apparatus. When only the condition (ii) is not satisfied (when only the condition (i) is satisfied), the processing goes to S1103. When only the condition (i) is not satisfied (when only the condition (ii) is satisfied), the processing goes to S1105. When both the conditions (i) and (ii) are not satisfied, the processing goes to S1108.

In S1103, the WSS management program 1126 determines whether a logical volume for pool extension is present in the storage apparatus set as the monitoring target. Since details of this processing are the same as S707 (FIG. 7), explanation of the details is omitted. When such a logical volume is present (Yes in S1103), the processing goes to S1104. When such a logical volume is not present (No in S1103), the processing goes to S1110.

In S1104, the WSS management program 1126 instructs the control program 1232 of the storage apparatus set as the monitoring target to set a usable logical volume in the difference pool 1214. According to the instruction, the control program 1232 extends the difference pool. The allocation state (the logical volume management table 1222 (FIG. 3)) 3005 of a logical volume set in the difference pool is changed to "in use". The monitoring processing for the storage apparatus ends.

In S1105, the WSS management program 1126 determines whether a logical volume which can create a copy of an original snapshot is present in the storage apparatus set as the monitoring target. Since details of this processing are the same as S705 (FIG. 7), explanation of the details is omitted. When such a logical volume is present (Yes in S1105), the processing goes to S1106. When such a logical volume is not present (No in S1105), the processing goes to S1110.

In S1106, the WSS management program 1126 instructs the control program 1232 of the storage apparatus set as the monitoring target to create a copy of the original snapshot in a logical volume "unused" in another PG and having a capacity larger than the capacity of the original snapshot. The control program 1232 creates a copy of the original snapshot and stores the copy in the designated logical volume.

In S1107, the WSS management program 1126 associates a writable snapshot stored in a logical volume, which is determined as being in a performance excess state, and based on the original snapshot whose copy is created in S1106 with an original snapshot (a new GI) at a copy destination. The processing concerning the storage apparatus set as the monitoring target ends.

In S1108, the WSS management program 1126 determines whether a logical volume for copying of the original snapshot and a logical volume for pool extension are present in the storage apparatus set as the monitoring target. Details of this determination processing are the same as S709.

In S1109, the WSS management program 1126 instructs the control program 1232 of the storage apparatus set as the monitoring target to create a copy of the original snapshot in an "unused" logical volume in the storage apparatus and sets the "unused" logical volume of the storage apparatus in the difference pool area 1214. According to this instruction, the control program 1232 creates a copy of the original snapshot and extends the area of the difference pool. The processing goes to S1107. A writable snapshot is associated with a new original snapshot at a copy destination.

In S1110, the WSS management program 1126 attempts to migrate the writable snapshot to a storage apparatus different from the storage apparatus set as the monitoring target. Details of the processing are explained with reference to FIG. 12. Both the original snapshot and difference data are migrated. However, when plural original snapshots (copies) are present in a storage apparatus at a migration destination, only the difference data may be migrated.

In S1111, the WSS management program 1126 determines whether the writable snapshot can be migrated to another storage apparatus. When the writable snapshot can be migrated (Yes in S1111), the processing ends and goes to monitoring processing of a storage apparatus set as the next monitoring target. When the writable snapshot cannot be migrated (No in S1111), the WSS management program 1126 notifies the user of an error. A method for the error notification is as explained above.

When the copying of the original snapshot is performed in the processing explained above, in addition to an operation same as that during the creation of a writable snapshot, concerning several writable snapshots based on the same original snapshot in the WSS management table 1125, the ST_ID 6003 and the LDEV_ID 6004 are changed to a storage apparatus and a logical volume at a copy destination.

<Details of S1111 (WSS Migration Processing Between Storage Housings>

Figure 12:
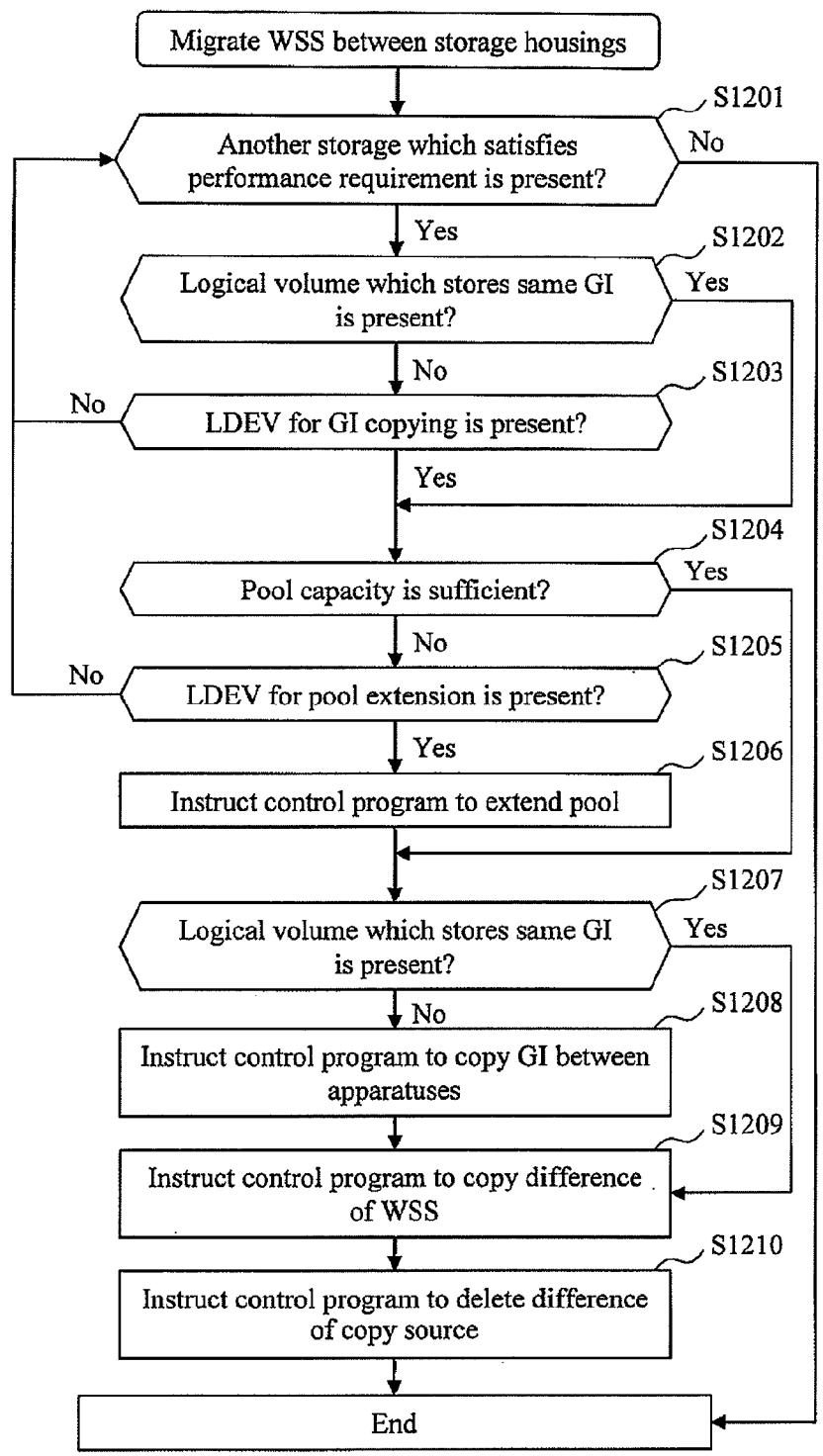
FIG. 12 is a flowchart for explaining details of S1111 (WSS migration processing between housings) in FIG. 11.

FIG. 12 is a flowchart for explaining details of S1111 (WSS migration processing between storage housings) in FIG. 11.

In S1201, the WSS management program 1126 determines whether a storage apparatus which satisfies the performance requirement is present among storage apparatuses different from the storage apparatus set as the monitoring target. As in S1101, the WSS management program 1126 refers to the storage management table 1121 (FIG. 2), subtracts the performance (IOPS: the IO amount 6006 shown in FIG. 6) used in an already existing writable snapshot from the storage performance (IOPS) 2003 of the storage apparatus set as the processing target, and determines whether a value obtained by the subtraction is larger than the desired average IO amount 4005 and there is still a margin in the performance. When a storage apparatus which satisfies the performance requirement is not present (No in S1201), the processing ends and goes to S1112. When a storage apparatus which satisfies the performance requirement is present (Yes in S1201), the processing goes to S1202.

In S1202, the WSS management program 1126 determines whether a logical volume which stores an original snapshot same as the original snapshot set as a migration target is present in the storage apparatus (the storage apparatus set as a migration destination candidate) specified in S1201. When such a logical volume is present (Yes in S1202), the processing goes to S1204. When such a logical volume is not present (No in S1202), the processing goes to S1203.

In S1203, the WSS management program 1126 determines whether a logical volume for original snapshot copying is present in the storage apparatus set as the migration destination candidate. Specifically, the WSS management program 1126 determines whether a logical volume which has a capacity larger than the capacity of an original snapshot to be copied (see the GI capacity 4007) and whose allocation state 3005 is "unused" is present in the storage apparatus set as the migration destination candidate. When such a logical volume is present (Yes in S1203), the processing goes to S1204. When such a logical volume is not present (No in S1203), the processing returns to S1201. The WSS management program 1126 determines again whether another storage apparatus which satisfies the performance requirement is present.

In S1204, the WSS management program 1126 determines whether a pool capacity of a difference pool area of the storage apparatus set as the migration destination candidate is sufficient. Specifically, the WSS management program 1126 determines whether an unused capacity of a relevant pool (the pool unused capacity 5004) is larger than the capacity of the original snapshot (the GI capacity 4007). When the pool capacity is sufficient (Yes in S1204), the processing goes to S1207. When the pool capacity is insufficient (No in S1204), the processing goes to S1205.

In S1205, the WSS management program 1126 determines whether a logical volume for pool extension is present. Specifically, the WSS management program 1126 refers to the logical volume management table 1122 (FIG. 3) and determines whether a logical volume whose allocation state 3005 is "unused" is present in the storage apparatus specified in S801. When such a logical volume is present (Yes in S1205), the processing goes to S1206. When such a logical volume is not present (No in S1205), the processing returns to S1201. The WSS management program 1126 determines again whether another storage apparatus which satisfies the performance requirement is present. The WSS management program 1126 determines, according to the processing from S1201 to S1205, whether a storage apparatus other than the monitoring target is suitable as a migration destination.

In S1206, the WSS management program 1126 instructs the control program 1232 of the storage apparatus specified in S1201 (at this point, a storage apparatus determined as suitable as the migration destination storage apparatus) to extend the difference pool to the logical volume specified in S1204 (set the LDEV in the difference pool). According to the instruction, the control program 1232 sets the specified logical volume in the difference pool area 1214.

In S1207, the WSS management program 1126 determines whether a logical volume which stores an original snapshot same as the original snapshot set as the migration target is present in the migration destination storage apparatus. This is because, if the same original snapshot is already present, it is unnecessary to create a copy of the original snapshot in the migration destination storage apparatus and data of the difference pool (difference data) only has to be migrated to the migration destination storage apparatus. When such a logical volume is present (Yes in S1207), the processing goes to S1209. When such a logical volume is not present (No in S1207), the processing goes to S1208.

In S1208, the WSS management program 1126 instructs the control program 1232 of the migration destination storage apparatus to create, in the migration destination storage apparatus, a copy of the original snapshot present in the storage apparatus set as the monitoring target (a migration source storage apparatus). According to the instruction, the control program 1232 creates a copy of the original snapshot.

In S1209, the WSS management program 1126 instructs the control program 1232 of the migration destination storage apparatus to create, in a logical volume of the migration destination storage apparatus, a copy of difference data forming the writable snapshot present in the storage apparatus set as the monitoring target (the migration source storage apparatus). According to the instruction, the control program 1232 specifies a logical volume set as a migration destination on the basis of the management information 1231 (when a pool area is extended, a logical volume having the pool area or, when the capacity of a pool which a logical volume originally has is sufficient, the logical volume) and creates a copy of the difference data in the logical volume.

In S1210, the WSS management program 1126 instructs the control program 1232 of the storage apparatus set as the monitoring target (the migration source storage apparatus) to delete the difference data migrated from the logical volume forming the difference pool area. According to the instruction, the control program 1232 deletes the difference data.

The WSS migration processing between storage housings ends and the processing goes to S1111.

Update of the various relation tables during copying of the original snapshot, during the pool extension, and during creation of a writable snapshot is executed as explained in the processing shown in FIG. 11 in the same manner in the WSS migration processing between storage housings.

CONCLUSION

In the storage system (the computer system) according to the embodiment of the present invention, it is determined on the basis of configuration information and performance information of a storage apparatus, a logical volume, and an original snapshot whether the performance of the storage apparatus and the performance of the logical volume satisfy a performance requirement and a capacity requirement requested by a writable snapshot based on the original snapshot. When the requested performance requirement and/or capacity requirement is not satisfied, a use form of the storage apparatus is changed to satisfy the requested performance requirement and/or capacity requirement. The use form of the storage apparatus, for example, includes one of operations (processing) that a copy of the original snapshot serving as a base of the writable snapshot is created and stored in a logical volume (in the same storage apparatus or a different storage apparatus) different from the logical volume in which the original snapshot at a copy source is stored and that an unused logical volume is set as a difference pool area (extension of a pool) and used. Such control processing is executed when a new writable snapshot is created or when an operation state of an already existing writable snapshot is monitored. Consequently, it is possible to create and manage a writable snapshot including performance and/or a capacity requirement desired by the user while preventing the storage apparatus from reaching a performance limit and/or a capacity limit. The user can create, with single operation by the user (an input instruction for the number of WSSs to be created, a performance requirement, etc.), a writable snapshot which satisfies the performance and/or the capacity requirement of the user.

In some case, even if the storage apparatus itself satisfies the performance requirement and the like, a logical volume present in the storage apparatus does not satisfy the performance requirement and the like. In such a case, a copy of an original snapshot serving as a base is created in another logical volume in the same storage apparatus (if no usable unallocated logical volume is present in the same storage apparatus, a logical volume in another storage apparatus) and a writable snapshot is created on the basis of the copy. In this case, it is necessary to use a group of disk devices (a parity group) different from a logical volume in which the original snapshot at a copy source is stored. Consequently, since I/O requests are distributed, it is possible to eliminate a bottleneck with respect to the disk devices and create and manage a writable snapshot. Since this processing is automatically executed if the user issues a creation instruction or monitoring timing comes, for the user, appropriate use of the storage apparatus is realized without being aware of the configuration and the performance on the inside of the storage apparatus.

Even if the logical volume satisfies the performance requirement, in some case, the capacity of a difference pool area for storing difference data forming a writable snapshot reaches a limit. In such a case, an unallocated logical volume is extended and used as a new difference pool area. Consequently, it is possible to effectively use resources. Since this processing is also automatically executed if the user issues a creation instruction or monitoring timing comes, for the user, appropriate use of the storage apparatus is realized without being aware of the configuration and the performance on the inside of the storage apparatus.

The present invention can also be realized by a program code of software for realizing the functions of the embodiment. In this case, a storage medium having recorded therein the program code is provided to a system or an apparatus and a computer (or a CPU or an MPU) of the system or the apparatus reads out the program code stored in the storage medium. In this case, the program code itself read out from the storage medium realizes the functions of the embodiment explained above. The program code itself and the storage medium having the program code stored therein configure the present invention. As the storage medium for supplying such a program code, for example, a flexible disk, a CD-ROM, a DVD-ROM, a hard disk, an optical disk, a magneto-optical disk, a CD-R, a magnetic tape, a nonvolatile memory card, or a ROM is used.

It is also possible that an OS (operating system) or the like running on a computer performs a part or all of actual processing on the basis of an instruction of the program code and the functions of the embodiment are realized by the processing. Further, it is also possible that, after the program code read out from the storage medium is written in a memory on the computer, a CPU or the like of the computer performs a part or all of actual processing on the basis of an instruction of the program code and the functions of the embodiment are realized by the processing.

Moreover, it is also possible that the program code of the software for realizing the functions of the embodiment is delivered via a network, whereby the program code is stored in storing means such as a hard disk or a memory of a system or an apparatus or a storage medium such as a CD-RW or a CD-R and, when the program code is used, a computer (or a CPU or an MPU) of the system or the apparatus reads out and executes the program code stored in the storing means or the storage medium.

It is necessary to understand that the process and the technique explained above are not essentially related to any specific apparatus and can be implemented by any appropriate combination of components. Further, it is possible to use general-purpose devices of various types according to the teaching explained above. It may be seen that it is useful to build a dedicated apparatus to execute the steps of the method explained above. Various inventions can be formed by an appropriate combination of the plural components disclosed in the embodiment. For example, several components may be deleted from all the components explained in the embodiment. Further, the components explained in the different embodiments may be combined as appropriate. The present invention is described in relation to the specific examples. However, the specific examples are for explanation and are not for limitation in every aspect. It would be understood by those skilled in the art that there are a large number of combinations of hardware, software, and firmware suitable for carrying out the present invention. For example, the software explained above can be implemented in a program or a script language in a wide range such as assembler, C/C++, perk Shell, PHP, and Java (registered trademark).

Further, in the embodiment, control lines and information lines considered necessary in explanation are shown. Not all control lines and information lines are shown in terms of a product. All components may be coupled to one another.

In addition, other implementations of the present invention would be made apparent for those having ordinary knowledge in the technical field from the examination of the specification and the embodiment of the present invention disclosed herein. The various forms and/or components of the explained embodiment can be used independently or in any combination in a computerized storage system having a function of managing data. The specification and the specific examples are merely typical ones. The scope and the spirit of the present invention are indicated by the following claims.

REFERENCE SIGNS LIST 100 storage system (computer system)
1000 host computers
1011 input device
1012 CPU
1013 output device
1014 memory
1015 data I/F
1016 management I/F
1021 application
1100 management computers
1111 input device
1112 CPU
1113 output device
1114 memory
1115 management I/F
1121 storage management table
1122 logical volume management table
1123 original snapshot management table
1124 pool management table
1125 WSS management table
1126 WSS management program
1200 storage apparatuses (storage subsystems)
1211 disk controller
1212 disk devices
1213 logical volumes
1214 difference pool (difference pool area)
1221 data I/F
1222 management I/F
1223 CPU
1224 memory
1225 disk I/F
1231 management information
1232 control program

The invention claimed is:

1. A storage system comprising:
a first storage apparatus which is configured to comprise a processor and a plurality of storage devices,
wherein the processor is configured to manage a plurality of logical volumes provided by the storage devices in the first storage apparatus and to provide writable snapshots to be updated by a host, in which the writable snapshots are created by an original snapshot stored in a logical volume of the plurality of logical volumes and a difference pool which stores difference data between the original snapshot and each of the writable snapshots,
wherein if the original snapshot in the first storage apparatus reaches a performance limit, the processor creates a copy of the original snapshot in the first storage apparatus and creates a writable snapshot based on the copy, or creates an original snapshot in a second storage apparatus that is different from the first storage apparatus and creates a writable snapshot based on the copy,
wherein the processor deletes at least one of the writable snapshots by a user instruction, and
wherein the processor deletes the original snapshot, if there is no writable snapshots related to the original snapshot in the first storage apparatus.

2. The storage system according to claim 1,
wherein the processor determines the performance limit based on a performance requirement (IOPS) of the original snapshot.

3. The storage system according to claim 2,
wherein the processor manages a performance limit related to the storage devices, a performance limit related to the processor, and a capacity limit related to the plurality of logical volumes.

4. The storage system according to claim 3,
wherein if the first storage apparatus reaches the capacity limit, the processor creates the copy of the original snapshot in the second storage apparatus and creates a writable snapshot based on the copy of the original snapshot.

5. The storage system according to claim 3,
wherein if the first storage apparatus reaches the capacity limit, the processor extends a snapshot pool in the first storage apparatus and creates the writeable snapshot in the first storage apparatus.

6. The storage system according to claim 1,
wherein if the processor updates the original snapshot in the first storage apparatus, the processor manages to keep consistency between the original snapshot in the first and the second storage apparatuses.

\* \* \* \* \*